United States Patent
Gielis et al.

[11] Patent Number: 5,969,305
[45] Date of Patent: Oct. 19, 1999

[54] METHOD AND APPARATUS FOR INSTALLING AND MAINTAINING ELEVATOR SYSTEM CONTROLS

[75] Inventors: Michel Gielis, Muralto; Urs Lindegger, Cantone; Philippe Henneau, Minusio, all of Switzerland

[73] Assignee: Inventio AG, Hergiswil, Switzerland

[21] Appl. No.: 09/012,840

[22] Filed: Jan. 23, 1998

[30] Foreign Application Priority Data

Feb. 10, 1997 [EP] European Pat. Off. .............. 97810073

[51] Int. Cl.$^6$ ................................ B66B 1/34; B66B 5/00
[52] U.S. Cl. ............................................ 187/391; 187/247
[58] Field of Search .................................. 187/391, 393, 187/247

[56] References Cited

U.S. PATENT DOCUMENTS

| | | | |
|---|---|---|---|
| 4,930,604 | 6/1990 | Schienda et al. | 187/133 |
| 5,031,109 | 7/1991 | Gloton | 364/478 |
| 5,042,621 | 8/1991 | Ovaska et al. | 187/133 |
| 5,410,717 | 4/1995 | Floro | 395/800 |
| 5,616,894 | 4/1997 | Nieminen et al. | 187/247 |

FOREIGN PATENT DOCUMENTS

| | | |
|---|---|---|
| 0 321 325 | 6/1989 | European Pat. Off. . |
| 0 615 945 | 9/1994 | European Pat. Off. . |
| 0 652 502 | 5/1995 | European Pat. Off. . |
| 5-254745 | 10/1993 | Japan ............... 187/247 |

OTHER PUBLICATIONS

Computer Design, pp. 54,60,64,68–70, Oct. 1997.

Primary Examiner—Robert E. Nappi
Attorney, Agent, or Firm—MacMillan, Sobanski & Todd, LLC

[57] ABSTRACT

An apparatus and a method for installing and maintaining elevator system controls includes a storage card (1) having a storage element (2) in which elevator control data is stored. An elevator installation becomes operational upon inserting the storage card (1) into a control point (10) of an elevator control system (11). The storage card (1) can fulfill further functions, such as, for example, the monitoring of maintenance utilizing a trip recorder for indicating that maintenance is due after a predetermined number of trips of the associated elevator car.

8 Claims, 2 Drawing Sheets

METHOD AND APPARATUS FOR INSTALLING AND MAINTAINING ELEVATOR SYSTEM CONTROLS

BACKGROUND OF THE INVENTION

The present invention relates to a method and a device for installing and maintaining controls for elevator systems.

A method for the storage and display of control data for elevator installations is shown in the European Patent No. 0 615 945. In this method, a storage card that is carried by the service engineer is used. The storage card can contain data such as installation data for the configuring of the elevator, fault-reporting text, and instructions for carrying out service operations, the type of data depending upon the respective degree of authorization of the service engineer. The storage card does not remain permanently in the elevator installation, but the requisite data is transferred into the installation from the storage card in each case by way of an interface terminal and, at the end of the operations, the storage card is removed by the service engineer.

In the case of the method described in the foregoing document, the service engineer must carry such a storage card for each separate elevator installation in order to transfer the individual data for an elevator on the occasion of installing an elevator system. So as to be able to actually deal with the storage cards, a costly interface terminal must be provided in each elevator control, in order to read data from and write data to the card. Also, with use of this card, an individual matching of customer-specific requirements of the respective installation is necessary on site.

SUMMARY OF THE INVENTION

The present invention concerns an apparatus for installing and maintaining an elevator system control including a storage card having elevator control data stored thereon in a storage element, the elevator control data determining operation of an elevator installation; and a control point in a control system for an elevator installation, the storage card being insertable into the control point for electrical connection to the control system, whereby the control system operates the elevator installation in accordance with the stored elevator control data only while the storage element remains electrically connected to the control system. A retaining means for the storage card includes an upper frame part having a guide attached thereto for slidably retaining the storage card and a hinged frame attached to the upper frame part by a joint for selectively covering the storage card.

The present invention also concerns a method for installing and maintaining elevator system controls comprising the steps of: storing elevator control data in a storage element of a storage card; mounting the storage card in a control print of a control system of an elevator installation to be controlled; electrically connecting the storage element of the storage card with the control system; and operating the control system in accordance with the stored elevator control data only while the storage element remains electrically connected to the control system.

It is an object of the invention to provide a method and a device for the installing and maintaining of controls for elevator installations that do not exhibit the aforesaid disadvantages of the prior art devices and that enable a simple and economic configuring of the elevator installation.

The advantages achieved by the invention are that on commissioning of the elevator system, a storage card is inserted into the elevator system control on site, which card already contains all data and options specific to the installation, so that a time-consuming configuring operation is no longer necessary.

Apart from the putting in of elevator system data, the storage card can fulfill further functions. For example, the storage card can contain a trip recorder that requires a maintenance service after elapsing of a predetermined number of trips of the elevator car. Moreover, the storage card is very economical. Further, through the use of an identification number, the elevator installation and/or the storage card can be very simply protected against misuse.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
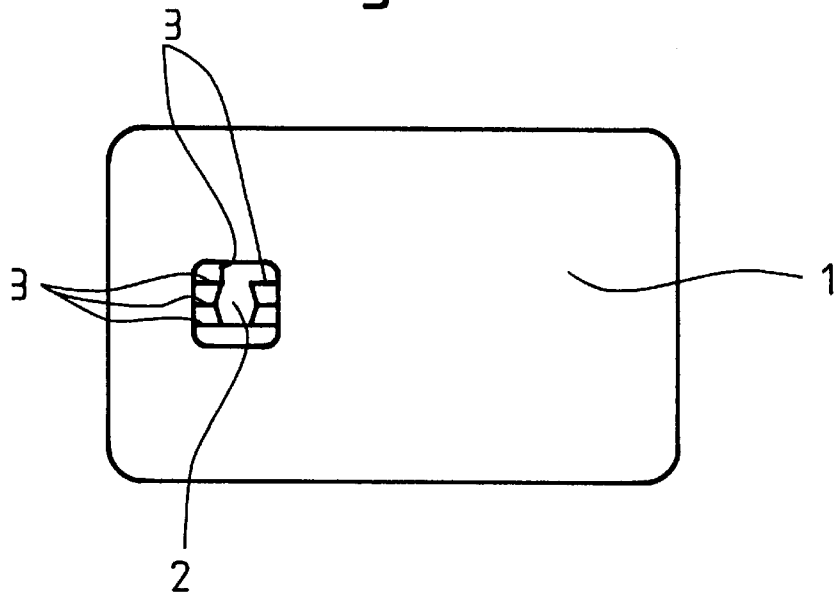
FIG. 1 is a plan view of a storage card used in the method and apparatus in accordance with the present invention.

There is shown in the FIG. 1 a storage card 1 having a storage element 2 arranged thereon for storing data. The storage card 1 can be formed, for example, in a typical credit card size format, or also smaller or larger. The storage element 2 contains an entire set of software for the control of an elevator installation. The storage element 2 is provided with a plurality of electrical contacts 3, by way of which the content of the stored data can be read or written. The storage card 1 can be prepared with the ordering of an elevator installation such that the necessary control or configuration software is available to the system control at the time of installation and the time-consuming configuring of the elevator installation on site is no longer necessary.

Figure 2:
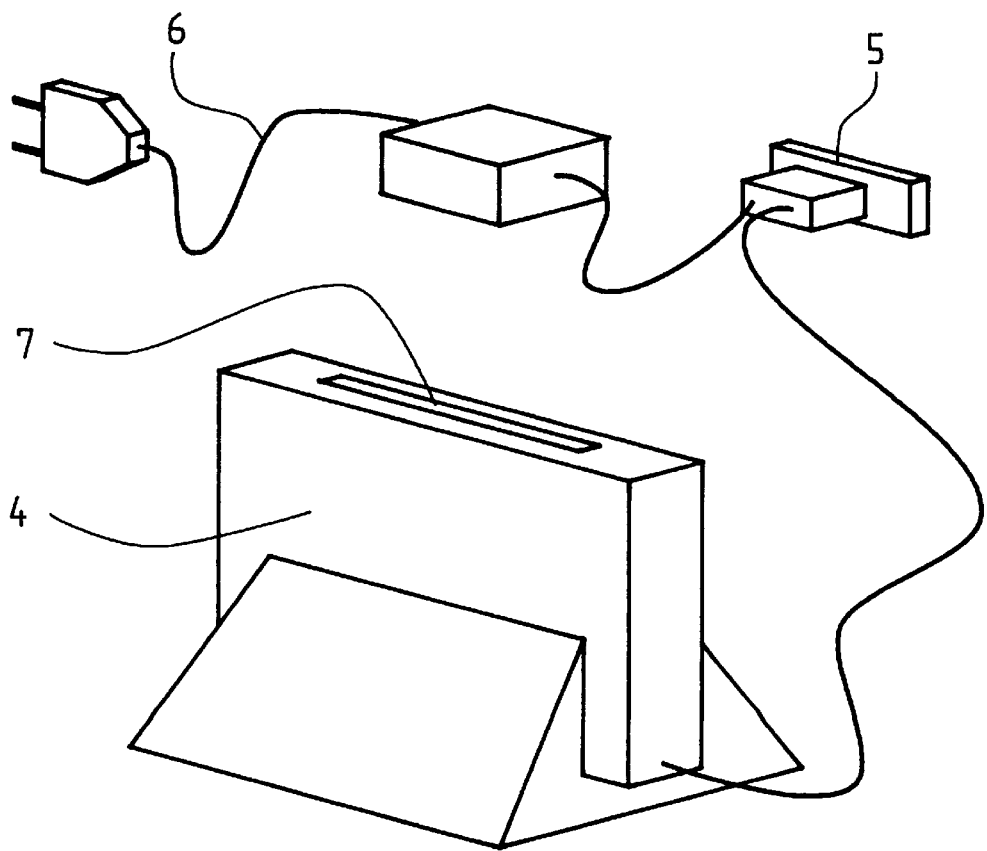
FIG. 2 is a perspective view of an apparatus for programming the storage card shown in the FIG. 1.

The FIG. 2 shows an apparatus 4 used for programming the storage card 1. This programming apparatus 4 can be connected by an interface 5 with a commercially available personal computer (not shown). The programming apparatus 4 can be supplied with electrical power either fed by way of a cable 6 directly from a building mains, or operated by means of batteries (not shown). The storage card 1 is inserted into a slot 7 of the programming apparatus 4. Thereafter, the storage element 2 can be processed by the programming apparatus 4 to store data received from a personal computer connected to the interface 5.

The elevator control can thus be matched to the customer requirements in a very simple mode and manner. For subsequently desired additional control options, or in the case of an installation modernization, the storage card 1 can be replaced by another storage card containing the new data. Also, an identification number that must correspond with the identification number of the related elevator installation in order to be able to put the elevator system into operation, is stored in the storage element 2 of the storage card 1. All installation components communicating with the elevator system control, such as operating panels, door drives, loadmeasuring equipment, etc., are provided with this identification number, which number is checked by the storage card 1. Each storage card 1 can thereby be used for only a single elevator installation, which excludes a misuse of the cards.

Further, it is possible to additionally use the storage card 1 as monitoring means. For example, the storage card 1 can contain a trip recorder, whereby after a predetermined number of trips of the elevator car, a maintenance service is automatically required. Upon performing the maintenance service, a new storage card 1 with an unused trip recorder can simply be inserted.

Figure 3:
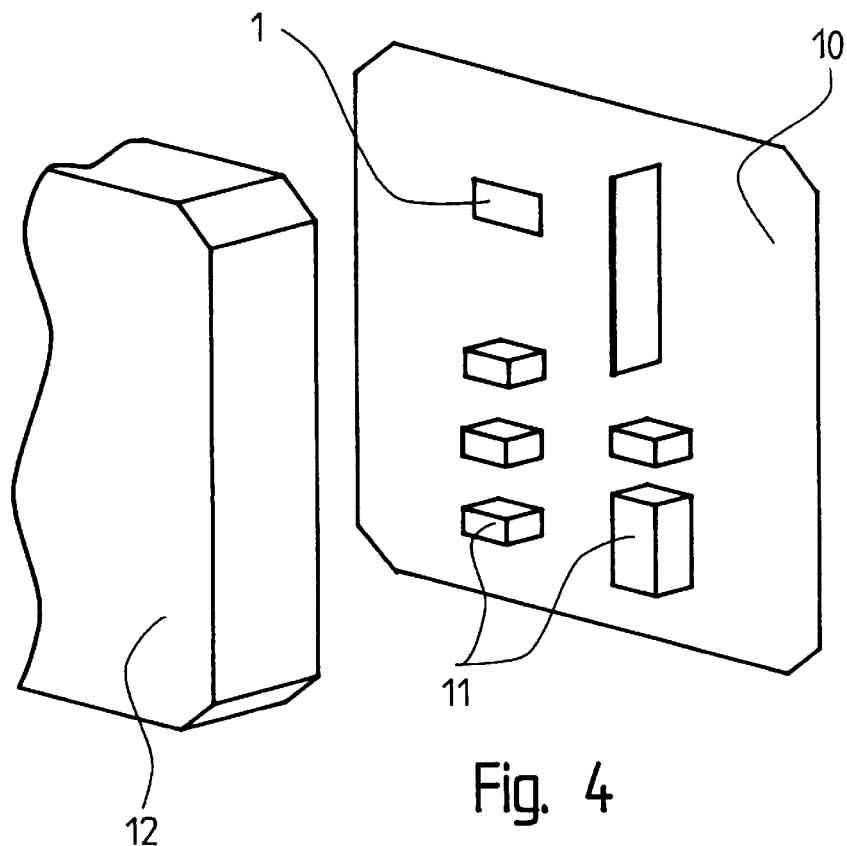
FIG. 3 is a schematic perspective view of a portion of an elevator system control the storage card shown in the FIG. 1 inserted.

The FIG. 3 shows a schematic illustration of a portion of the control of an elevator installation with the storage card 1. A control point 10 includes an electronic control system 11 for performing a multiplicity of elevator-related functions and is protected during operation by a cover 12 shown in a removed position. During the putting into operation of the elevator installation, the storage card 1 is inserted into the control point 10. At this time, the storage card 1 already contains all necessary control data for the elevator system control in the storage element 2. This control data comprises data specific to the installation, such as group control or single elevator control, drive control, number of floors served by the elevator, desired special functions such as VIP operation, fire protection system or energy-saving mode, handicapped person control, etc. During the operation of the elevator, the storage card 1 remains permanently in the installation or on the control point 10 and is replaced by a new control card 1 only if changes in the control functions are required or after run down of the trip recorder. Without the storage card 1, the elevator is not functionally capable. Desired special functions and options are activated by the storage card 1. An alternative to mounting the storage card 1 directly on the control point 10 is to mount at a remote location in the elevator installation and connect with the control print 10 by a cable or the like.

Figure 4:
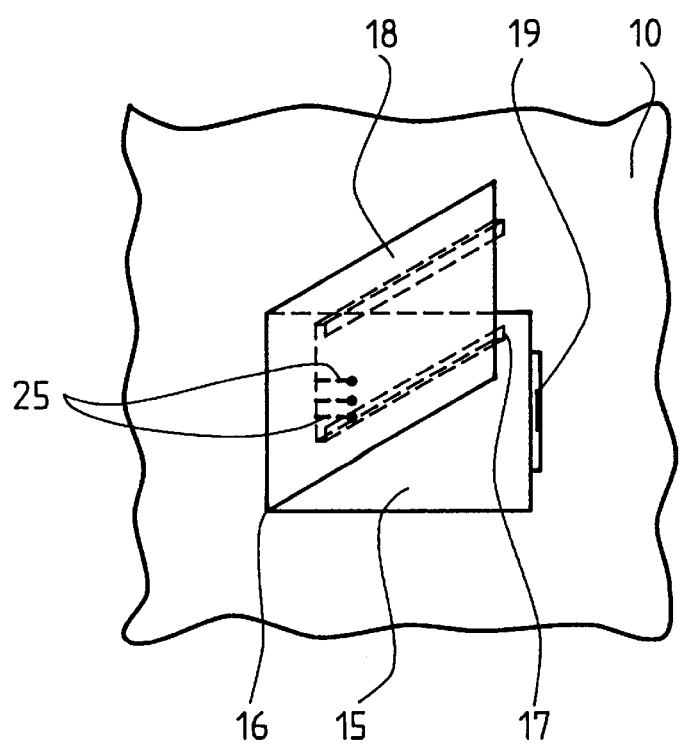
FIG. 4 is a perspective view of a device for fixing the storage card on a control point.

There is shown in the FIG. 4 a hinged frame 15 for fixing the storage card 1 on the control point 10. This hinged frame 15 has a joint or hinge 16 at one edge, so that it can be opened. In the opened state of the frame 15, the storage card 1 can be inserted into an upper frame part 13 of the hinged frame with the assistance of a guide 17 and retained in the guide. Thus, the guide 17 and the frame part 13 for a retaining means for the storage card 1. Thereafter, the hinged frame 15 is closed. In the closed state, the hinged frame is secured to the upper frame part 18 by, for example, a snap closure 19. Contact tongues 25 (shown in dashed lines) are arranged on the hinged frame 15 and, when the hinged frame is closed, ensure the electrical connection between the contacts 3 of the storage element 2 and the electronic control system 11 on the control point 10. This form of fastening guarantees not only a very good electrical connection between the tongue contacts 25 and the contacts 3 of the storage element 2, but the storage card 1 can be changed at any time in a simple manner and without the use of tools. When the hinged frame 15 is open, the tongue contacts 25 are spaced from the contacts 3 and the storage card 1 is free to slide into and out of the guide 17.

The present invention relates to a method for installing and maintaining elevator system controls comprising the steps of: a) storing elevator control data in the storage element 2 of the storage card 1; b) mounting the storage card in the control print 10 of the control system 11 of an elevator installation to be controlled; c) electrically connecting the storage element of the storage card with the control system; and d) operating the control system in accordance with the stored elevator control data only while the storage element remains electrically connected to the control system.

The present invention also relates to an apparatus for installing and maintaining an elevator system control including: the storage card 1 having elevator control data stored thereon in the storage element 2, the elevator control data determining operation of an elevator installation; and the control point 10 in the control system 11 for the elevator installation, the storage card being insertable into the control point for electrical connection to the control system, whereby the control system operates the elevator installation in accordance with the stored elevator control data only while the storage element remains electrically connected to the control system. The apparatus includes the retaining means 17, 18 for releasably retaining the storage card 1 in the control point 10. The retaining means includes the upper frame part 18 having the guide 17 attached thereto for slidably retaining the storage card 1 and the hinged frame 15 attached to the upper frame part by the joint 16 for selectively covering the storage card. The storage card 1 has the plurality of contacts 3 connected to the storage element 2 and the retaining means 17, 18 has the plurality of contact tongues 25 for contacting the contacts to electrically connect the storage element to the control system 11. The storage element 2 has a read/write memory and includes a trip recorder for counting a number of trips made by an elevator car controlled by the control system 11.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for installing and maintaining an elevator system control comprising:

a storage card having elevator control data stored thereon in a storage element, said elevator control data determining operation of an elevator installation;

a control point in a control system for an elevator installation, said storage card being insertable into said control point for electrical connection to said control system; and a retaining means for releasably retaining said storage card in said control point, said retaining means including an upper frame part having a guide attached thereto for slidably retaining said storage card and a hinged frame attached to said upper frame part by a joint for selectively covering said storage card whereby said control system operates the elevator installation in accordance with said stored elevator control data only while said storage element remains electrically connected to said control system.

2. The apparatus according to claim 1 wherein said storage element has a read/write memory and includes a trip recorder for counting a number of trips made by an elevator car controlled by said control system.

3. An apparatus for installing and maintaining an elevator system control comprising:

a storage card having elevator control data stored thereon in a storage element, said elevator control data determining operation of an elevator installation;

a control point in a control system for an elevator installation, said storage card being insertable into said control point for electrical connection to said control system; and a retaining means for releasably retaining said storage card in said control point wherein said storage card has a plurality of contacts connected to said storage element and said retaining means has a plurality of contact tongues for contacting said contacts to electrically connect said storage element to said control system whereby said control system operates the elevator installation in accordance with said stored elevator control data only while said storage element remains electrically connected to said control system.

4. The apparatus according to claim 3 wherein said storage element has a read/write memory and includes a trip recorder for counting a number of trips made by an elevator car controlled by said control system.

5. A method for installing and maintaining elevator system controls comprising the steps of:

a. storing elevator control data in a storage element of a storage card;

b. releasably mounting the storage card in a retaining means at a control point of a control system of an elevator installation to be controlled, the retaining means being in an open state;

c. moving the retaining means to a closed state to electrically connect the storage element of the storage card with the control system; and d. operating the control system in accordance with the stored elevator control data only while the storage element remains electrically connected to the control system.

6. The method according to claim 5 wherein said step a. includes storing an identification number in the storage element of the storage card, the stored identification number corresponding to an identification number associated with at least one of the elevator installation and components of the elevator installation.

7. The method according to claim 6 wherein said step d. is performed only when the stored identification number corresponds to the identification number associated with at least one of the elevator installation and components of the elevator installation.

8. The method according to claim 5 including a step of moving the retaining means to the open state, removing the storage card from the retaining means and inserting into the retaining means another storage card having different elevator control data stored therein for changing operating characteristics of the elevator installation, and repeating said steps c. and d.

* * * * *